(12) United States Patent
Foreman (10) Patent No.: US 6,763,594 B2
(45) Date of Patent: Jul. 20, 2004

(54) CORDLESS ALIGNMENT SYSTEM HAVING CONVENIENTLY INTERCHANGEABLE BATTERIES

(75) Inventor: Matthew Todd Foreman, Greenbrier, AR (US)

(73) Assignee: Snap-On Incorporated, Pleasant Prairie, WI (US)

( * ) Notice: Subject to any disclaimer, the term of this patent is extended or adjusted under 35 U.S.C. 154(b) by 33 days.

(21) Appl. No.: 10/137,354

(22) Filed: May 3, 2002

(65) Prior Publication Data

US 2002/0162231 A1 Nov. 7, 2002

Related U.S. Application Data (60) Provisional application No. 60/288,457, filed on May 4, 2001.

(51) Int. Cl.[7] ............................................. G01B 11/275
(52) U.S. Cl. ................ 33/203.18; 33/288; 33/DIG. 21; 439/76.1
(58) Field of Search ......................... 33/203.18, 203.19, 33/203.2, 203, 286, 288, DIG. 21; 439/76.1, 147, 136; 429/96, 97, 99, 100, 123

(56) References Cited

U.S. PATENT DOCUMENTS

| | | | | |
|---|---|---|---|---|
| 3,881,961 A | * | 5/1975 | Nation .......................... | 429/97 |
| 5,132,877 A | * | 7/1992 | Branan et al. ............... | 361/736 |
| 5,280,273 A | * | 1/1994 | Goldstein .................... | 340/632 |
| 5,391,972 A | * | 2/1995 | Gardner et al. ............. | 320/115 |
| 5,404,090 A | * | 4/1995 | Shinbori ....................... | 307/66 |
| 5,508,123 A | * | 4/1996 | Fan .............................. | 429/96 |
| 5,736,271 A | * | 4/1998 | Cisar et al. .................... | 429/96 |
| 6,155,856 A | * | 12/2000 | Sanada ........................ | 439/246 |
| 6,261,715 B1 | * | 7/2001 | Nakamura et al. .......... | 429/100 |
| 6,302,454 B1 | * | 10/2001 | Tsurumaru et al. ......... | 292/175 |
| 6,403,254 B1 | * | 6/2002 | Wang .......................... | 429/123 |
| 6,474,123 B1 | * | 11/2002 | Kito et al. ................. | 70/456 R |
| 6,513,251 B2 | * | 2/2003 | Huang et al. ................. | 33/286 |
| 6,552,650 B1 | * | 4/2003 | Gokcebay et al. ......... | 340/5.65 |

\* cited by examiner

Primary Examiner—Christopher W. Fulton
Assistant Examiner—Amy R. Cohen
(74) Attorney, Agent, or Firm—McDermott Will & Emery LLC (57) ABSTRACT

A cordless vehicle wheel alignment sensor head with interchangeable batteries includes easy to replace rechargeable batteries, thus eliminating the need for a service call to replace the batteries and allows the operator to swap a nearly depleted battery set with a fully or partially charged battery set. The sensor head includes a battery compartment door which slides upwards without pivoting about or detaching from the sensor head, and allows the batteries to pop out and be replaced. The battery compartment door also includes at least one battery engaging protrusion which presses against the battery at a non-contacting end of the rechargeable battery when the battery compartment door is closed. Accordingly, with the battery compartment door closed, the battery is tightly held in place and pressed into a pair of retractable pins that result in electrically coupling the battery to the sensor circuitry.

24 Claims, 10 Drawing Sheets

CORDLESS ALIGNMENT SYSTEM HAVING CONVENIENTLY INTERCHANGEABLE BATTERIES

CROSS REFERENCE TO RELATED APPLICATION

This application claims priority to Provisional U.S. Application Serial No. 60/288,457, filed on May 4, 2001, the disclosure of which is incorporated herein by reference.

FIELD OF THE INVENTION

The present invention relates to an alignment system and, more particularly, to such an apparatus improved with easily removable, rechargeable batteries to power an alignment sensor head module.

BACKGROUND OF THE INVENTION

Battery technology has made significant advances over the past few years. As a result batteries with higher capacity are available at lower cost. Furthermore, these higher capacity batteries are rechargeable and take less physical space since they are not as bulky as their predecessors were.

Consequently, devices that require electric energy to operate are now available with an integrated battery module rendering the devices cordless. One family of devices in particular involves automotive service equipment, such as vehicle wheel alignment systems. These devices are designed to include cordless alignment sensor heads including an integrated battery module. The sensors are applied, e.g., to a wheel of a vehicle in order to make necessary measurements relating to the alignment of that wheel. The information is then transferred to a console, which includes a computer, for analyzing the sensed information. The console is typically located in the alignment shop where the alignment is taking place.

The batteries in these sensors are typically integrated into the battery compartment of the sensor so as to prevent them from becoming loose and compromising electrical contact which results in losing alignment data. Accordingly, conventional cordless sensors are not amenable to rechargeable batteries that are easily removable from the sensor. Thus, when the sensor's battery runs out, instead of just replacing the battery, the whole unit is taken out of service and placed in a charge station while its battery is being recharged. This will result in the sensor being out of service for several hours while its battery is being recharged. Further, these sensors typically utilize batteries which are not amenable to being easily swapped, as they are held in place by fasteners because the batteries have to be able to withstand a great deal of vibration due to the very nature of the shop and particularly when placed on the wheel during alignment. Once the battery's life runs out, i.e., the battery is no longer capable of being recharged, a service technician is usually called to remove the old batteries and install a new set.

Another problem occurs when the battery runs out while the technician is performing an alignment. In this case, the technician has to plug in cords from the console to power the sensor unit externally, or remove the sensor and store it at the console's storage station to commence a battery recharging operation. Neither alternative is desirable. The first option of externally powering the sensor by plugging in cords, effectively makes the unit non-cordless, eliminating the advantages of a cordless unit. The second option results in having to halt the alignment process while the sensor unit is placed in the storage station at the console to be recharged.

Figures 1A, 1B, 1C:
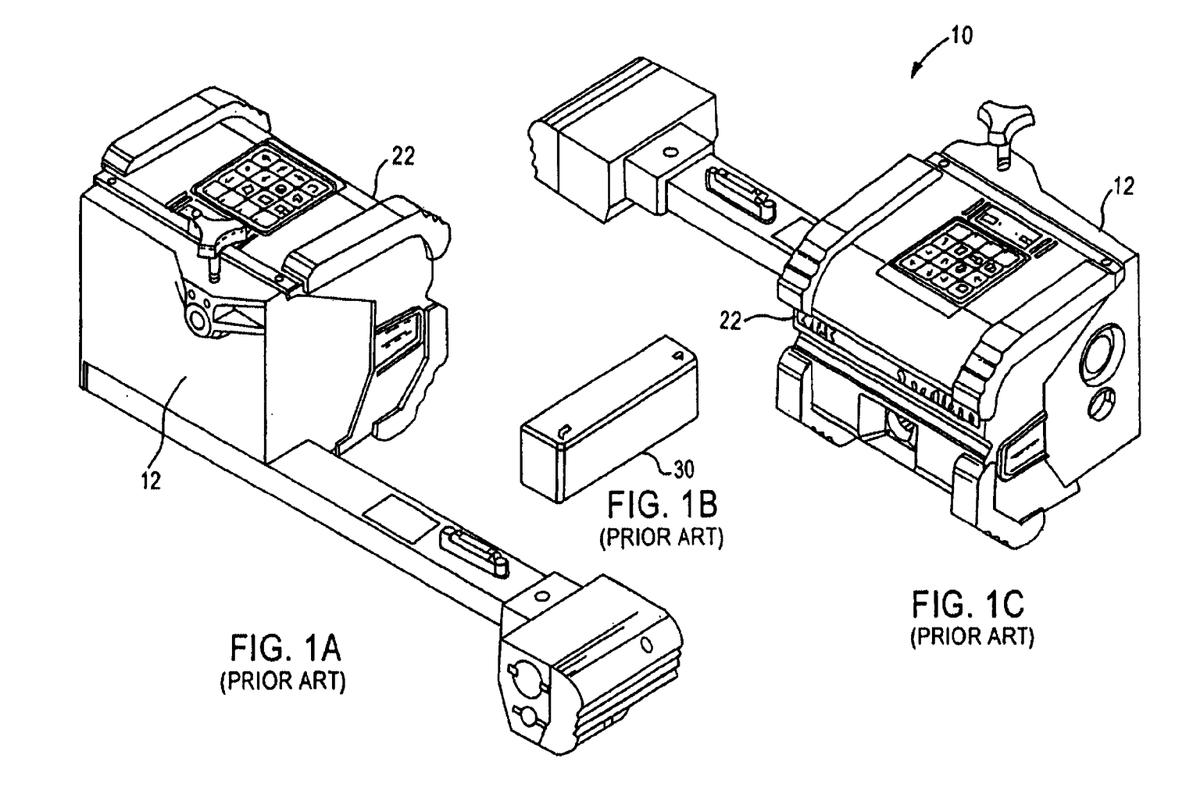
FIG. 1A is a perspective front side elevational view of a conventional cordless alignment sensor module.
FIG. 1B is a battery used with a conventional cordless alignment sensor module.
FIG. 1C is a perspective backside elevational view of a conventional cordless alignment sensor module.

FIGS. 1A and 1C show perspective views of a conventional cordless sensor with an integrated battery module according to the prior art. The cordless sensor 10 typically includes gelled electrolyte cell batteries (known in the art as a "gel cell") such as battery 30 as illustrated in FIG. 1B. These types of batteries are typically heavy and bulky, and require a physical connection to a terminal. These batteries also typically require heavy brackets to keep them in place and substantially free from movement. Replacing these batteries is a difficult and tedious task typically requiring a service technician to disassemble the sensor module to gain access to the batteries.

In order to replace the battery 30 of the cordless sensor 10, a technician will first remove the cover 22 from the main sensor body 12. Then the technician will disconnect any wires attached to the battery 30. If any brackets holding the battery 30 in place have been used, they are removed in order to free the battery. The technician reverses this process to install a new battery resulting in additional down time.

Accordingly, there exists a need for a cordless battery operated alignment sensor head having an easily removable and rechargeable battery.

SUMMARY OF THE INVENTION

The ability to provide a battery-powered cordless wheel alignment sensor head with an easily removable and rechargeable battery is demonstrated. A first rechargeable battery may be replaced by a second rechargeable battery once the first battery is at or near the end of its charge life. The depleted battery is easily removed by sliding upwards a compartment door to a battery compartment placed in the rear of the cordless sensor module. The battery is electrically coupled to the sensor via contacts that includes a pair of retractable pins. The pins provide the contact to the positive and the negative terminals of the battery which, in the example shown, are located at the same end of the battery, i.e., the end opposite to the end closest to the battery compartment door. However, other configurations are possible. Accordingly, the user is able to easily change the battery without the need for a service call. In this way, the sensor unit need not be placed out of service while its battery is being replaced or recharged. The sensor's battery is simply removed and quickly replaced by a fully or partially charged battery.

In another embodiment, the sensor head includes a battery module place in the rear of the sensor unit. Access to the battery module may be blocked, e.g., by a battery compartment door which is slideably attached thereto. The door therefore does not detach from or pivot about the unit, which prevents accidental breakage or loss of the door piece. The embodiment is mechanically designed to offer battery interchangeability and operator convenience when the battery needs to be removed. Additionally, the battery door includes protrusions placed on the inner surface of the battery door which presses onto a battery when in the closed position resulting in the battery being substantially secure in place and free of movement as the sensor is applied to measure alignment characteristics of a vehicle. The protrusions, however, do not establish electrical contact or form a path of current flow upon contact with the battery.

Once the battery door is in the closed position, an inward protrusion located at the inner surface of the battery compartment door presses onto a battery in order to keep the battery firmly in place so as not to compromise electrical contacts made at the contacting-end of the battery. The contacting-end of the battery includes both a positive and a negative terminal, which are seperated by a battery cap. A pair of retractable pins properly located at a PCB board located inside the battery compartment are used for electrically coupling the battery with the PCB board.

Additional advantages and novel features will be set forth in part in the description, which follows, and in part will become apparent to those skilled in the art upon examination of the various embodiments. The embodiments shown and described provide an illustration of the best mode contemplated. Modifications are possible in various obvious respects without departing from the spirit and scope thereof. Accordingly, the drawings and description are to be regarded as illustrative in nature, and not as restrictive. The advantages may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF THE INVENTION

A new cordless alignment sensor head including an easily removable and rechargeable battery is disclosed. The cordless alignment sensor module is used as an integral part of an alignment system, such as, but not limited to, a vehicle wheel alignment system and the like. The sensor's batteries can be swapped easily and rapidly without the loss of alignment data already collected. Further, the sensor can remain operational with a fully charged battery while its depleted battery is being recharged.

Figure 2:
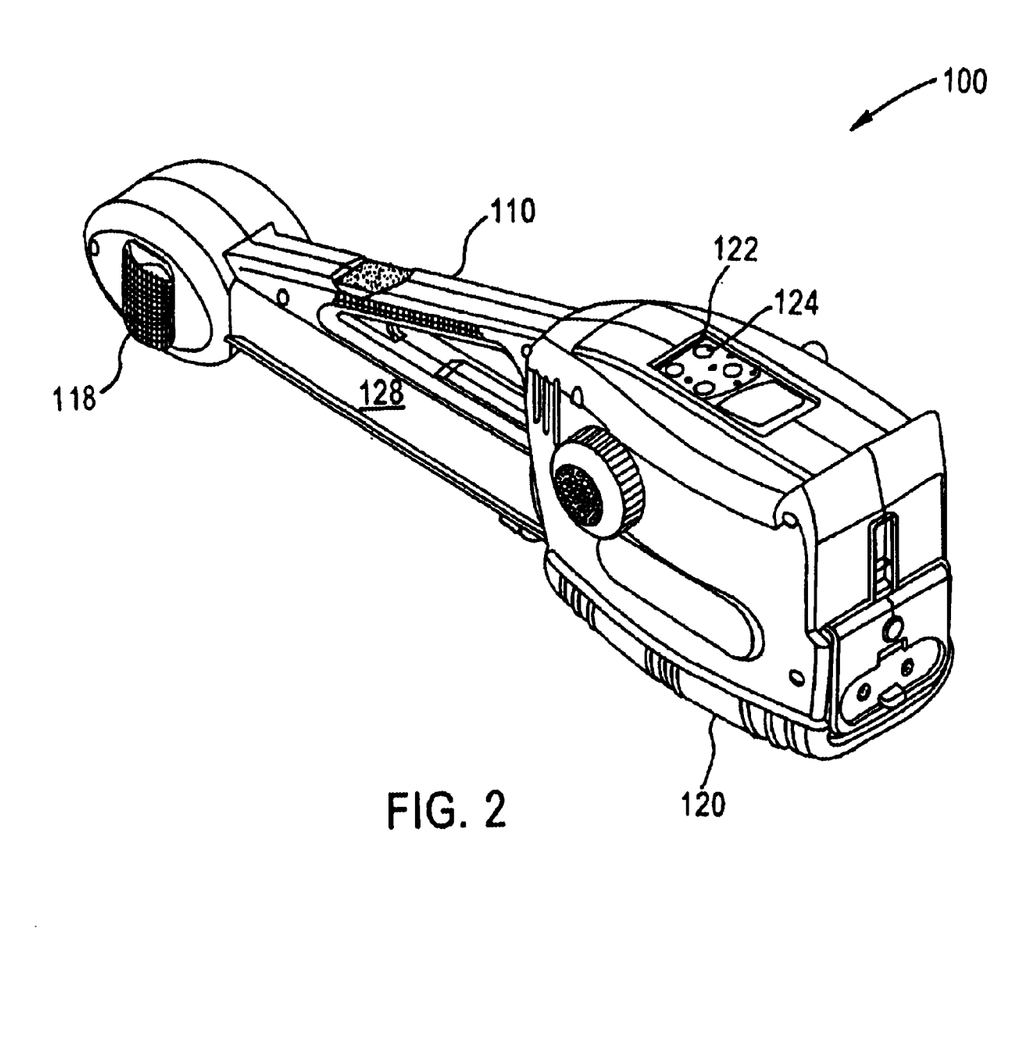
FIG. 2 is perspective side elevational view of an exemplary alignment sensor head.
Figure 3:
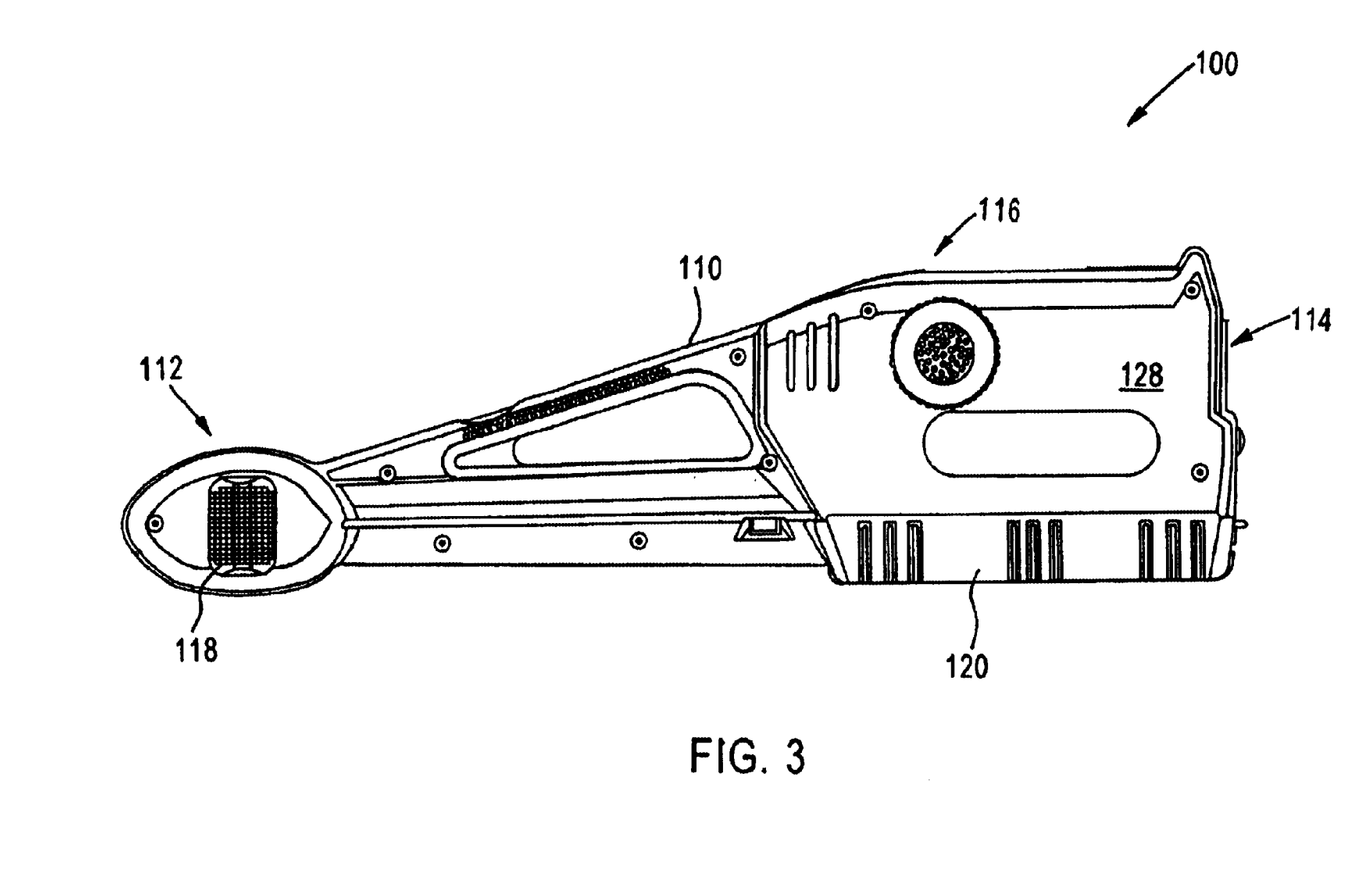
FIG. 3 is a side elevational view of an exemplary alignment sensor head.
Figure 4:
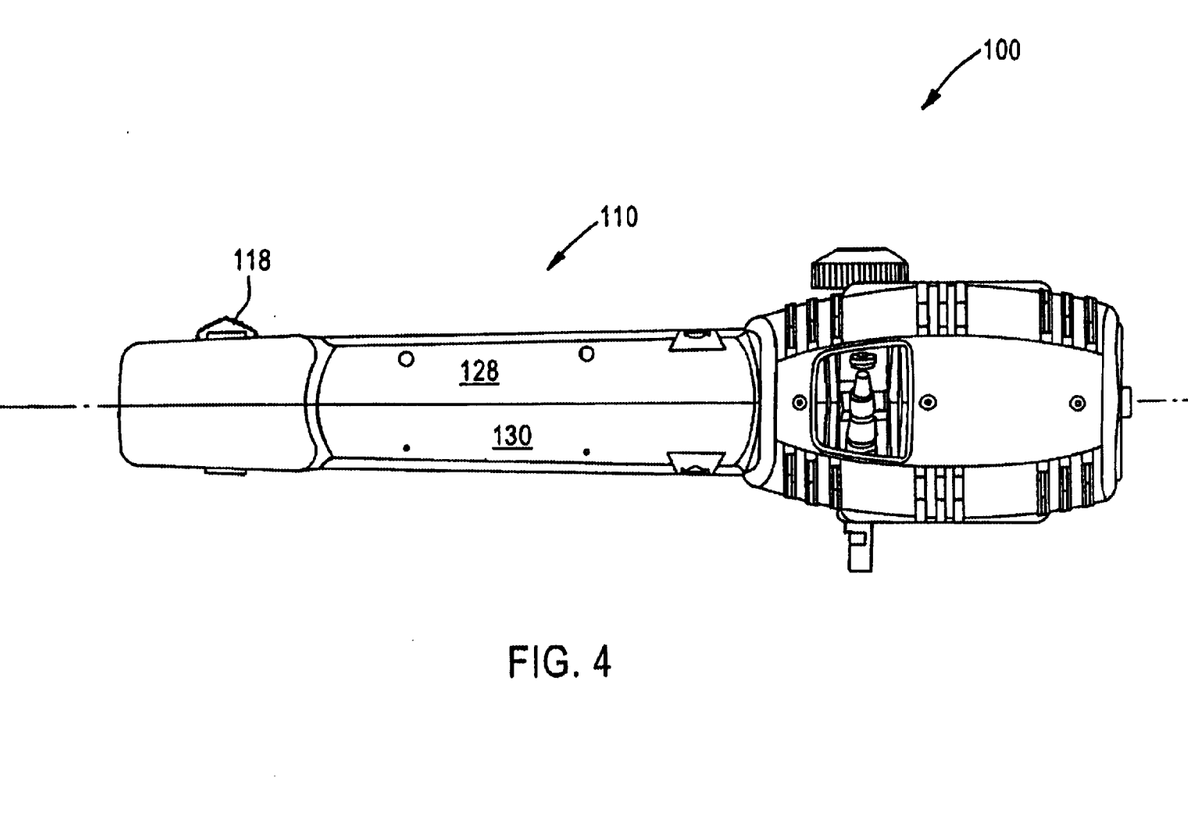
FIG. 4 is a bottom plan view of an exemplary alignment sensor head.

Referring to FIGS. 2–4, an exemplary alignment sensor head 100 is illustrated. The alignment head 100 includes a housing 110 that has a hollow interior and is capable of securely receiving all the components necessary for performing an alignment procedure. The housing 110 can be constructed from various materials, such as structural foam or plastic, using economical molding processes. As illustrated in FIG. 3, the housing 110 includes a front portion 112, a rear portion 114, and a central portion 116. A front bumper 118 is attached to the side of the front portion 112. Additionally, a main bumper 120 is attached to the bottom of the housing 110 and extends from the central portion 116 to the rear portion 114.

The alignment head 100 can be provided with a user interface 122 disposed on a top surface of the housing 110, as shown in FIG. 2. The user interface 122 includes a keypad 124. During alignment procedures, an operator can input information and/or select menu items using the keypad 124. Accordingly, the keypad 124 can include a plurality of keys sufficient for both entering letters and numbers, as well as navigating through menus. Alternatively the alignment head 100 does not require a user interface 122. Rather, information is entered and displayed externally using, for example, an external control system (not shown) that can include a CRT display unit coupled to a keyboard, or personal computer (not shown) executing software for performing the alignment.

The housing 110 is in the form of a left cover 128 and a right cover 130, as shown in FIG. 4. The left and right covers 128, 130 are adapted for engagement with each other using mating components, to form the housing 110. In addition to the use of mating components, various fasteners can be used to secure the left cover 128 to the right cover 130. The interior of the housing 110 includes various moldings designed to retain securely a plurality of components when the left cover 128 and right cover 130 are attached to each other. According to such a feature, the components are not displaced if the alignment head 100 is subject to impact.

Figure 5:
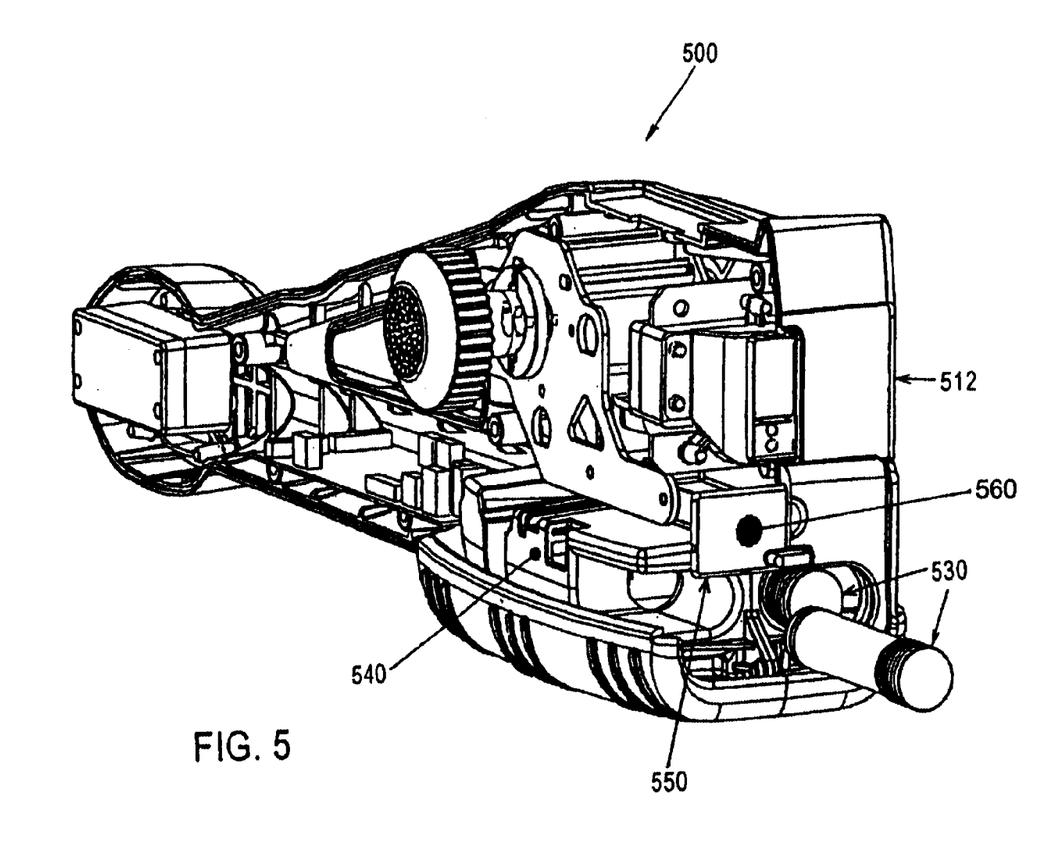
FIG. 5 is a perspective view of an exemplary cordless alignment sensor module with removable and rechargeable batteries according to one embodiment, with one housing side removed.

Referring now to FIG. 5, a perspective view of an exemplary alignment sensor with its right cover intact and its left cover removed so as to expose the left half of the sensor head. The cordless alignment sensor 500 includes a main sensor body 512, one or more rechargeable batteries 530, a battery compartment 540, and a battery compartment door 550. The main sensor body 512 also houses the battery compartment 540, which in turn holds the rechargeable batteries 530. The battery compartment 540 contains a battery interface printed circuit board "PCB" (not shown, but described later). Description of structural features not related to the invention is omitted for brevity.

Door 550 is constructed and arranged to slide vertically within opposite side located channels or guides. The door 550, so arranged does not pivot about and is not removable from, the body 512. To replace the batteries 530, the user simply slides the battery compartment door 550 upward into an open position as depicted in FIG. 5, and pulls the batteries out of the compartment 540. The battery compartment door 550 holds the batteries 530 in place and in contact with a contact (not shown). The battery compartment door includes an inward protrusion located in the area opposite to the darkened circle 560 on the outer surface of the door 550 shown in FIG. 5. This protrusion corresponds to protrusion 758 depicted in the embodiment of FIG. 9B, element 758. The protrusion helps keep the batteries firmly in place when the battery door is slid downward into a closed position.

Accordingly, this embodiment provides a cordless alignment sensor with easily removable and rechargeable batteries. The embodiment may be used for any alignment application, such as with a vehicle wheel alignment system, and the like. Additionally, any type of rechargeable battery such as Nickel Cadmium and the like may be used to provide the necessary power to the alignment sensor module. Because the door 550 cannot pivot on, or separate from, the sensor body, the door is not apt to become misplaced or damaged by shop use.

Figure 6:
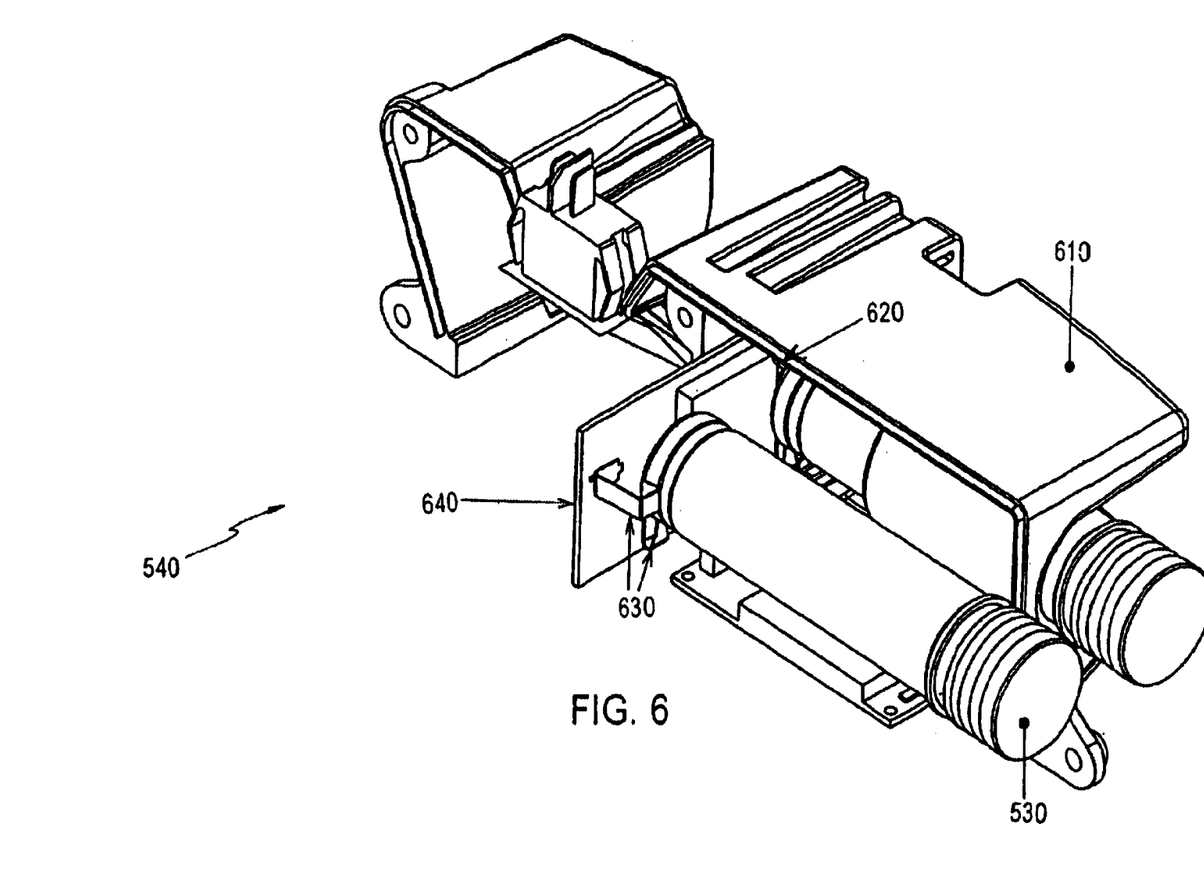
FIG. 6 is a perspective view of a portion of an exemplary battery module according to one embodiment.

Referring to FIG. 6, an exemplary battery compartment depicted in FIG. 5 that contains battery interface PCB and rechargeable batteries is illustrated. The battery compartment 540 includes two rechargeable batteries 530, a battery module 610, a battery stop 620, battery terminals 630, and battery interface PCB 640. To install new batteries, the operator slides the batteries 530 into the battery module 610 until the batteries 530 engage the battery terminals 630 and the battery stop 620. The battery terminals 630, which include both negative and positive terminal connections, electrically couple battery 530 to the battery interface PCB 640. The operator then slides the battery compartment door 550 downwards (as shown in FIG. 5) which causes the protrusions located on the inner surface of the door 550 to compress the batteries into the interface PCB 640 and make good electrical contact. The protrusion is designed such that once the battery door in the closed position, the battery is substantially secure in place and electrical connection is not compromised as the unit is applied to measure alignment of a vehicle wheel when the apparatus is used for that purpose.

Figure 7A:
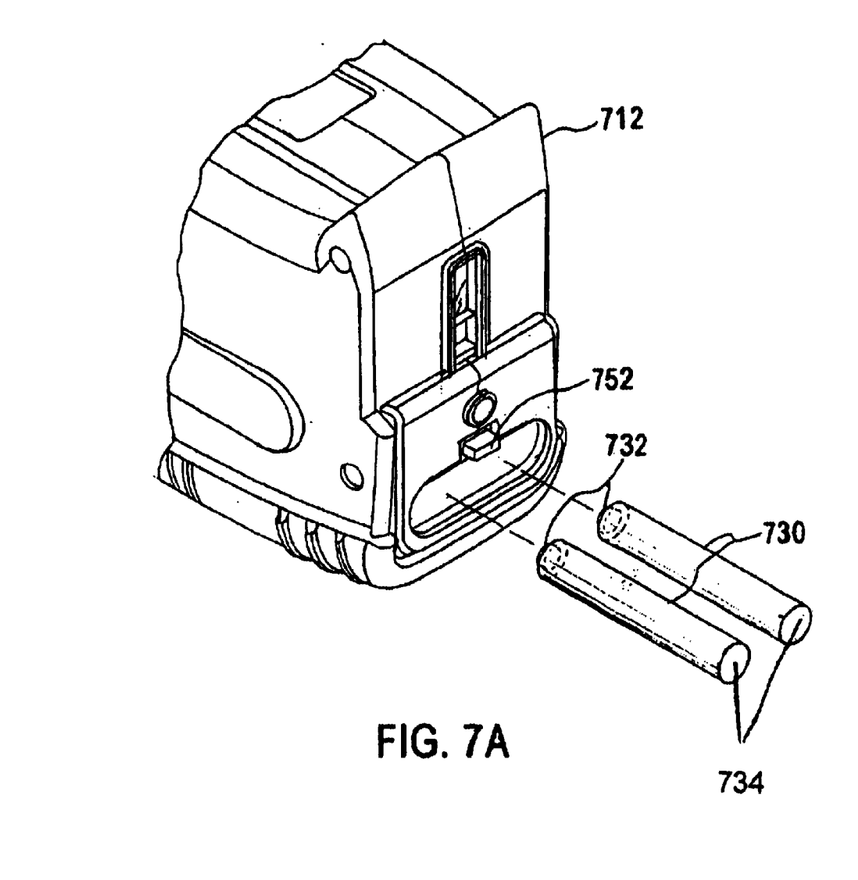
FIG. 7A is a perspective view of an exemplary battery compartment, with its compartment door open, and corresponding batteries ready for placement according to one embodiment.
Figure 7B:
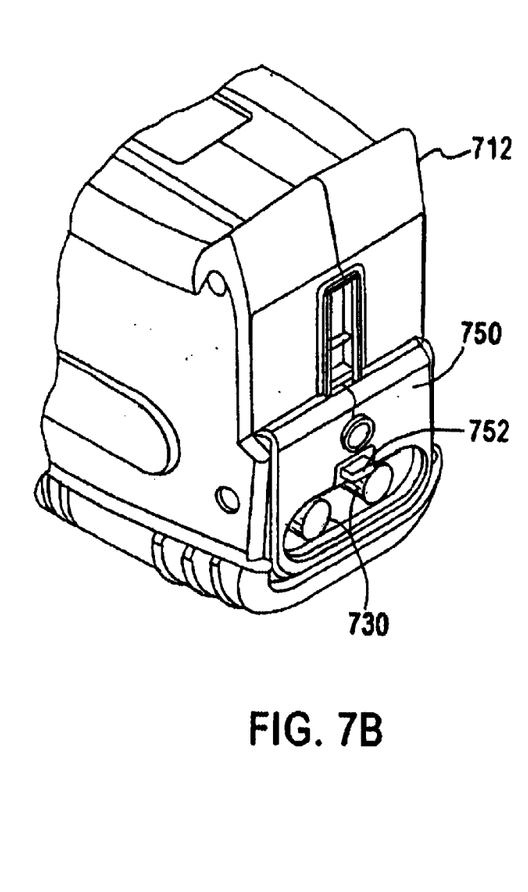
FIG. 7B is a perspective view of an exemplary battery compartment with its compartment door open and corresponding batteries in place according to one embodiment.
Figures 10, 10A:
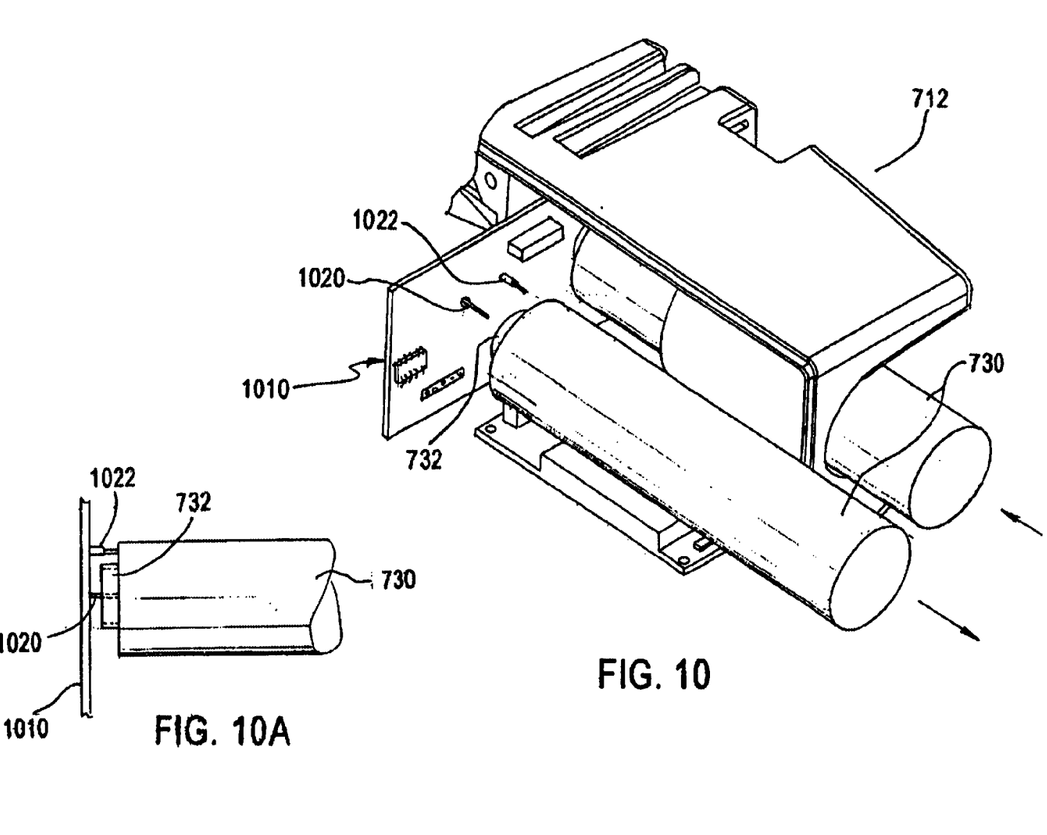
FIG. 10 is a perspective view of a part of the battery compartment showing the batteries and terminal board.
FIG. 10A is a perspective view of a part of the battery compartment showing the battery's contact with retractable pins.

Referring to FIGS. 7A, 7B, and 10, a perspective back view of an exemplary sensor head is again illustrated. FIG. 10 shows a perspective view of a part of the battery compartment according to another embodiment. FIG. 7A, shows the battery compartment door in the open position, and batteries 730 and 731 ready for deployment, while FIG. 7B shows the battery compartment door in the open position but the batteries 730 and 731 fully in place.

Figure 8A:
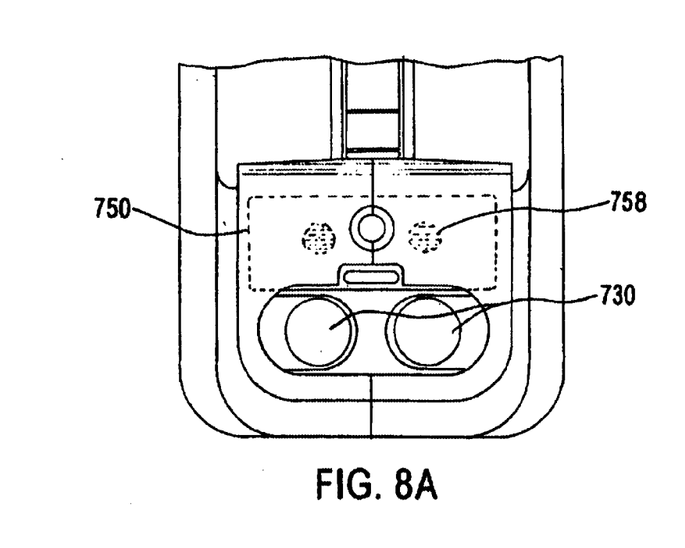
FIG. 8A is an end view of an exemplary battery compartment, with its compartment door open and corresponding batteries in place according to one embodiment.
Figure 8B:
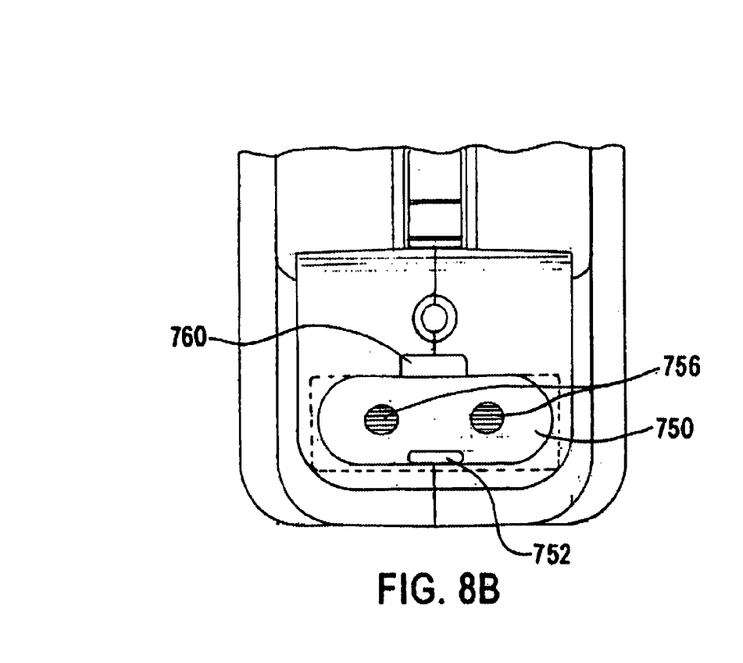
FIG. 8B is an end view of an exemplary battery compartment according to one embodiment, with its compartment door closed.

Referring to FIGS. 8A and 8B, an end view of the sensor head is illustrated. In FIG. 8A, the battery compartment door is in the open position, while FIG. 8B shows the battery compartment door is in the closed position. The battery compartment door 750, which is visible in the closed position, includes the battery compartment door handle 752 and a pair of battery engaging protrusions mounted (for example, by molding) on the inside of the battery compartment door 750. The pair of protrusions can be visualized as being on the opposite sides of the circles 756 shown on the battery compartment door 750.

As shown in FIG. 8B, when the batteries 730 are locked in place and the battery compartment door 750 in the closed position, each battery engaging protrusion 758 (shown as dashed lines in FIG. 8A since located on the inside of the door 750) presses against a battery end 734. Once the batteries 730 are so engaged, the batteries are secure in place and thus the electrical couplings at the opposite terminals of the batteries are not compromised.

Figure 9A:
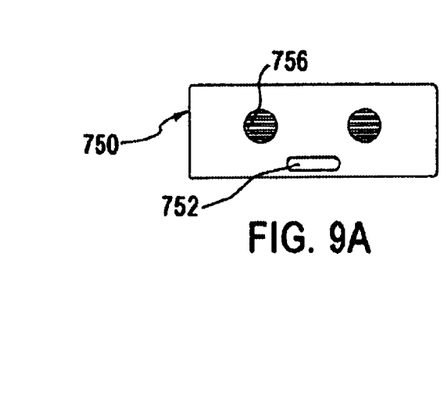
FIG. 9A is a frontal view of an exemplary battery compartment door according to one embodiment.
Figure 9B:
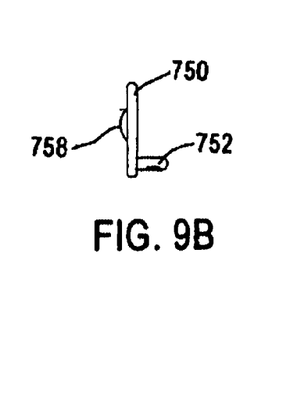
FIG. 9B is a side view of an exemplary battery compartment door according to one embodiment.

Referring to FIGS. 9A and 9B, a front and side view of an exemplary battery compartment door is illustrated. The battery compartment door 750 includes the battery compartment door handle 752, and battery engaging protrusions 758 (shown in FIG. 9B) which create the grooved and slightly concave circles 756 on the frontal side of the battery compartment door 752. Although the embodiment includes a pair of protrusions, the invention is not thus limited. The number of protrusions is related to the number of batteries used. Although in the embodiments shown, only two batteries have been utilized, the invention is not limited to any particular number of batteries used.

Batteries 730 and 731 (FIG. 7A) include a contacting-end and a non-contacting end. The contacting end is the end that provides electrical contact with the interface PCB 1010 as shown in FIG. 10 and FIG. 10A. As shown in FIG. 10A, the battery cap 732 is used to isolate the positive terminal from the negative terminal of the battery 730. Accordingly, the retractable pin 1022 and 1020 are situated such that pin 1022 contacts battery 730 outside cap 732, e.g., the positive terminal, and pin 1020 contacts battery 730 inside the cap 732, e.g., the negative terminal.

The non-contacting end is the opposite end and makes no electrical connection. The protrusions 758 located on the inside of the battery door are designed to press against the battery end 734 in order to keep the battery in place. The advantage of the battery door mechanism is in the ability to keep the battery relatively free of movement when the unit is in use.

The battery compartment door, which includes a handle 752 (as shown in FIG. 7A) is not visible when in the open position since it slides upwards into a cavity. Accordingly, the only visible part of the battery compartment door when in the open position is the handle 752.

When batteries need to be replaced, the operator slides the battery compartment door 750 upward by using the door handle 752. The door 750 will slide all the way up until the door handle 752 reaches the opening 760, at which point, the batteries can be easily pulled out and replaced with fully charged batteries. To close the battery compartment door 750, the operator downwardly presses on the handle 752. Once the battery engaging protrusion 758 presses against the battery end 734 and the battery compartment door is in the closed position, the battery is held tightly in place. The size of the protrusion is such that the batteries are substantially secure in place.

Figure 11A:
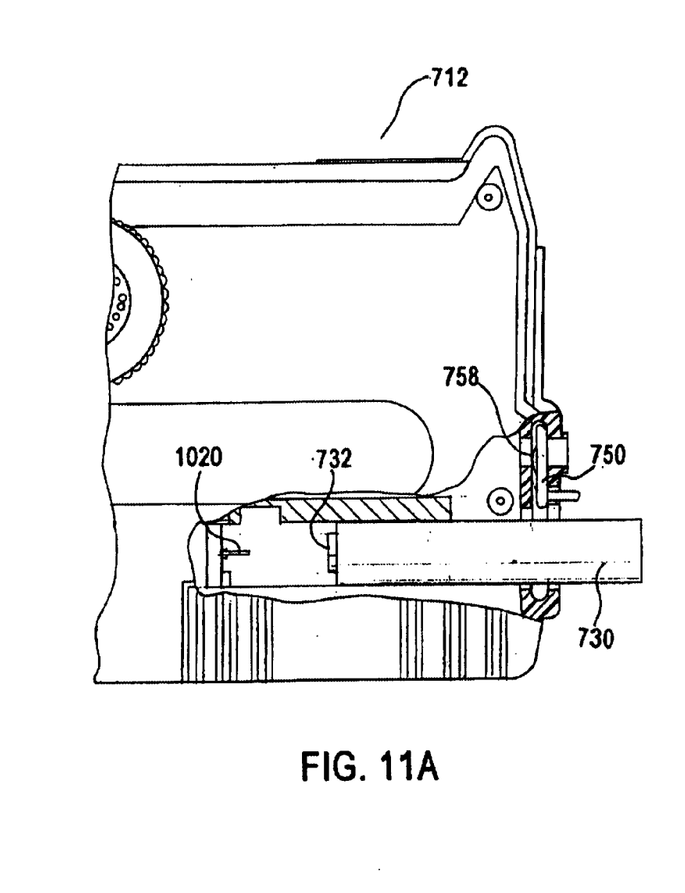
FIG. 11A is a side sectional view of the battery compartment with the battery compartment door open and batteries halfway in place according to one embodiment.
Figure 11B:
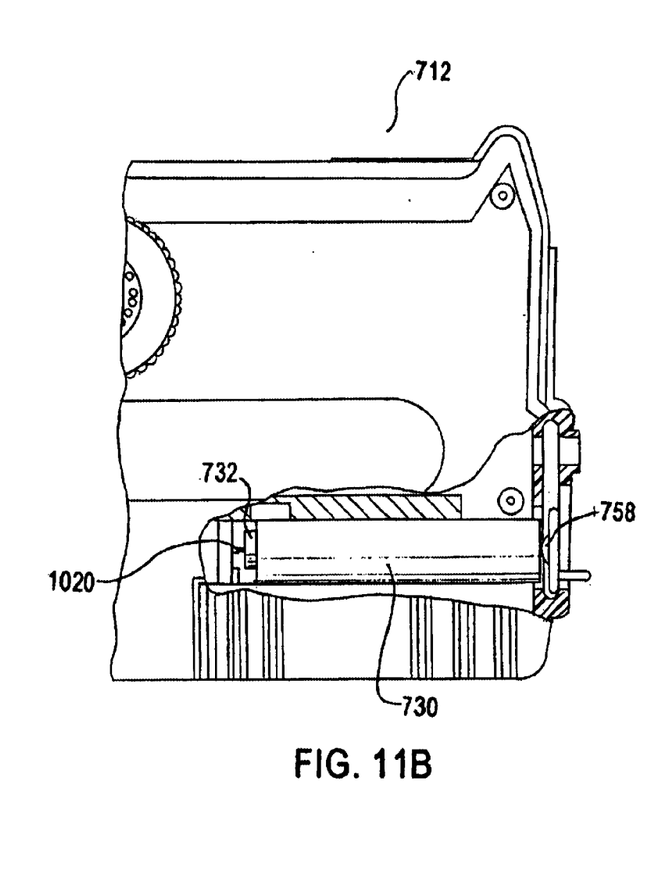
FIG. 11B is a side sectional view of the battery compartment with the batteries fully locked in place.

Referring to FIGS. 10, 10A, 11A and 11B, perspective views of a part of the battery compartment according to an embodiment is illustrated. The battery compartment 712, which is shown with batteries 730 half inserted, includes the interface PCB 1010 which in turn includes a pair of retractable pins 1020 and 1022 per battery (one per terminal). When the batteries are fully in place and the battery door 750 in the closed position (as shown in FIG. 11B), the retractable pins 1020 and 1022 are pressed in and the batteries 730 are electrically coupled to the interface PCB 1010. The pins 1020 and 1022 are placed on the PCB 1010 such that one pin makes a connection with the center of the battery 730 and inside the cap 732 (e.g., the positive terminal) while the other pin makes connection with the side of the battery and outside the cap 732 (e.g., the negative terminal).

Also, the battery engaging protrusion 758 is shown in FIG. 11A when the battery door 750 is in the open position. Once the battery door 750 is pressed downward, with the battery biased mechanically outward by pins 1020 and 1022, the battery engaging protrusion is pressed into the battery end 734 of the battery 730 in order to keep the battery firmly in place so that electrical connection at the opposite terminal is not compromised.

In the previous descriptions, numerous specific details are set forth, such as specific materials, structures, processes, etc., in order to provide a thorough understanding of the present invention. However, as one having ordinary skill in the art would recognize, the present invention can be practiced without resorting to the details specifically set forth. In other instances, well known processing structures have not been described in detail in order not to unnecessarily obscure the invention. For example, although the concepts described herein, in the field of vehicle wheel alignment, the concept can be applied to other alignment applications such as vehicle body alignment, aircraft wing alignment and the like.

Only examples of their versatility are shown and described. It is to be understood that various other combinations and environments are possible, as are changes or modifications to the concept expressed herein.

What is claimed is:

1. An alignment system comprising:
    a sensor head including:
        a battery compartment having an open end and enclosed end, the enclosed end having a printed circuit board and a retractable conductive pin such that when a battery is placed in the compartment and pressed against the retractable conductive pin, the battery becomes electrically coupled with the printed circuit board; and
        a door slideably attached to the open end of the battery compartment, having an inward protrusion positioned such that when the door is closed, the protrusion engages with a first end of the battery causing the battery to securely remain in place.

2. The alignment system of claim 1, in which the protrusion presses against the first end of the battery.

3. The alignment system of claim 2, wherein one end of the battery has a battery cap.

4. The alignment system of claim 3, wherein the door slides on the battery compartment between open and closed positions.

5. The alignment system of claim 1, wherein the inward protrusion is molded on the inner surface of the door.

6. A sensor head comprising:
    a sensor housing module; and
    a battery compartment electrically coupled to the sensor housing module, the battery compartment configured for retaining at least one rechargeable battery that includes a battery cap;
    a battery compartment door configured to slide on the compartment between open and closed positions, the battery compartment door having an inward protrusion, the protrusion positioned to press into a battery end when the battery compartment door is slid into the closed position; and
    an interface board including one or more retractable pins to electrically couple the battery to the interface board when the battery is placed in the battery compartment and the battery compartment door is slid into the closed position.

7. The sensor head of claim 6, wherein one end of the battery has a ring-shaped cap.

8. The alignment system of claim 6, wherein the battery compartment door is slideably attached to the battery compartment and further comprises a door handle.

9. The alignment system of claim 6, wherein the battery compartment door is non-pivoting about or removable from the battery compartment.

10. The alignment system of claim 6, wherein the battery compartment door slides upwards into a cavity within the sensor housing module.

11. The alignment system of claim 6, wherein the inward protrusion of the battery compartment door is located at the inner surface of the battery compartment door such that when the battery compartment door is slid into the closed position, the protrusion presses into the non-contacting battery end and holds the battery firmly intact.

12. A battery compartment for housing a rechargeable battery for a cordless sensor comprising:
    a battery housing having an open end and an enclosed end;
    means fixedly attached to the enclosed end of the battery housing for electrically coupling the battery to the cordless sensor; and
    a battery door slideably connected at the open end of the battery housing for engaging the battery and holding the battery securely in place inside the battery housing when the door is closed;
    wherein the battery door has a protrusion such that when the battery door is closed, the protrusion presses against the battery so as to cause the battery to make electrical contact with the means for electrically coupling the battery to the sensor, and the protrusion does not form a path of current flow upon contact with the battery.

13. The battery compartment of claim 12, wherein the means for electrically coupling the battery to the sensor further comprises a first retractable pin to electrically connect to the positive terminal of the battery and a second retractable pin to electrically connect to the negative terminal of the battery.

14. The battery compartment of claim 13, wherein the battery door comprises a surface protrusion for pressing against the battery when the door is closed.

15. The battery compartment of claim 14, wherein the surface protrusion is molded on the inner surface of the battery door.

16. The battery compartment of claim 15, wherein the battery comprises a non-contacting end placed at the open end of the battery housing and a contacting end having a ring-shaped cap at the enclosed end of the battery housing, and the first pin contacts the battery inside the battery cap ring, and the second pin contacts the battery outside the battery cap ring.

17. The battery compartment of claim 16, wherein the battery door includes a handle.

18. A method of changing a rechargeable battery of a cordless alignment head that includes a battery compartment including a slideably attached door having an inward protrusion located at an inner surface of the battery door, comprising:
    sliding the battery compartment door from a closed position to open position;
    removing a battery stored in the battery compartment and replacing the battery with another battery;
    sliding the battery compartment door from the open position to the closed position; and
    pressing the inward protrusion against an exposed end of the battery such that the battery is substantially secured inside the battery compartment;
    wherein the inward protrusion does not form a path of current flow upon contact with the battery.

19. The method of claim 18, further comprising causing the battery to become electrically coupled to a circuit board.

20. The method of claim 19, further comprising sliding the battery compartment into a cavity of the alignment head to provide access to the battery.

21. The method of claim 20, further comprising sliding the battery compartment door closed such that the protrusion presses against the battery and holds the battery substantially in place.

22. A cordless vehicle wheel alignment sensor head, comprising:
    a main sensor body;
    a battery compartment, electrically coupled to the main sensor body, including a battery compartment door with an inward protrusion; and
    one or more rechargeable batteries electrically coupled to the battery compartment, the battery compartment being configured and arranged on the main sensor body such that the rechargeable batteries are accessible for replacement;
    wherein:
        the inward protrusion presses against the battery when the battery compartment door is closed, such that the one or more rechargeable batteries are substantially secured inside the battery compartment; and the inward protrusion does not form a path of current flow upon contact with the one or more rechargeable batteries.

23. The cordless vehicle wheel alignment sensor head of claim 22, wherein the battery compartment includes a contact that electrically couples the one or more batteries to a battery interface printed circuit board.

24. The cordless vehicle wheel alignment sensor head of claim 23, wherein the battery compartment door slides into a cavity without detaching from the main sensor body.

* * * * *